Dec. 21, 1937.          K. MOERS          2,103,038
GASEOUS ELECTRIC ARC DISCHARGE LAMP DEVICE
Filed July 25, 1934
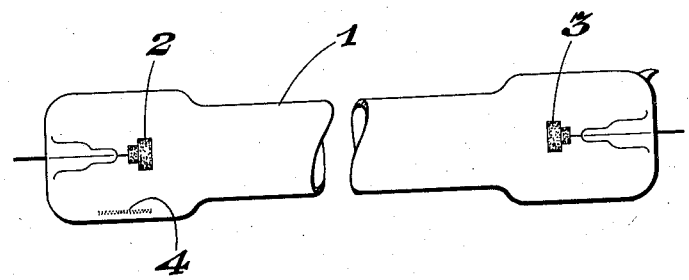
INVENTOR
Kurt Moers
BY Harry E. Dunham
ATTORNEY Patented Dec. 21, 1937

2,103,038

UNITED STATES PATENT OFFICE 2,103,038

GASEOUS ELECTRIC ARC DISCHARGE LAMP DEVICE

Kurt Moers, Berlin-Steglitz, Germany, assignor to General Electric Company, a corporation of New York Application July 25, 1934, Serial No. 736,940
In Germany August 24, 1933

4 Claims. (Cl. 176—122)

The present invention relates to gaseous electric arc discharge lamp devices generally and more particularly the invention relates to vapor arc discharge lamp devices.

Arc lamps having a vaporizable material therein, such as cadmium, and which are evacuated or filled with an inert gas, such as nitrogen or a rare gas, or which are constructed in such manner as to permit the entrance of air therein and to prevent the escape of the vapor therefrom are useful light sources. The cadmium vapor emits light of a color and quality useful for many purposes and increases the efficiency of the lamp. The electrodes of such lamps sputter badly during the operation of the device even though the electrodes are thoroughly degassed during the manufacture of the lamp and the sputtered electrode particles form light absorbing deposits on the container of the lamp after a short period of operation which reduces the efficiency of the lamp.

The object of the present invention is to avoid the formation of light absorbing deposits of sputtered electrode material on the container of lamp devices of the above type. A further object of the invention is to improve the efficiency and lengthen the useful operating life of cadmium vapor arc lamps. Still further objects and advantages attaching to the device and to its use and operation will be apparent to those skilled in the art from the following particular description.

I have discovered that light absorbing deposits of sputtered electrode material on the sealed container of a cadmium vapor arc lamp are avoided by using a gas having good heat conductivity characteristics, such as hydrogen, either alone or mixed with inert or reducing gases, such as nitrogen, carbon monoxide, hydrocarbons or rare gases, such as helium, as the principal gas in the device. The high heat conductivity characteristic of the hydrogen reduces the temperature of the electrodes below that of said electrodes when gases other than hydrogen are used in the lamp. The lower operating temperature of the electrodes decreases the sputtering of material therefrom. The electrode temperature reducing effect of the hydrogen, at least in part, is probably due to the fact that, at the temperature existing in the arc, the hydrogen dissociates into atoms which action consumes a great amount of heat. A hydrogen pressure of at least 3 mm. of mercury at room temperature whether the hydrogen is used alone or is mixed with inert or reducing gases is favorable for the occurrence of this phenomena.

In the drawing accompanying and forming part of this specification an embodiment of the invention is shown in a side elevational view, but as such illustration is primarily for purposes of disclosure it will be understood, of course, that numerous changes in the form and details of the device illustrated and in its use and operation may be made by those skilled in the art without departure from the broad spirit and scope of the invention.

Referring to the drawing the new and novel gaseous electric arc discharge lamp device comprises a container 1 having electrodes 2 and 3 sealed therein, one at each end thereof. Said container 1 has a quantity 4 of vaporizable material therein, such as cadmium, and a gaseous atmosphere therein comprising hydrogen at at least 3 mm. pressure.

The gas pressure depends upon the length of the arc discharge, among other factors. When the length of the arc is approximately 10 cm. or more a total gas pressure of 20 mm. at room temperature, or a total gas pressure of 90 mm. during the operation of the device is desirable. A gaseous atmosphere comprising a mixture of 25% hydrogen and 75% nitrogen is desirable in such a lamp.

While the arc discharge in the above described device is relatively stable the stability thereof can be increased, the starting thereof facilitated and the length thereof increased by introducing a small quantity of mercury, approximately 1 to 12% of the cadmium, into the container 1 of the lamp device. The spectrum of the light emitted by the lamp is thus filled out and is a close approximation of that of daylight.

The electrodes 2 and 3 of the new and novel arc discharge lamp consist of carbon in graphite form. When desired electrodes consisting of high melting point carbides, borides, nitrides or silicides alone or mixed with electron emitting material also having a high melting point, such as thorium oxide, are used. Electrodes consisting of a sintered mixture of pulverized particles of high melting point metal and high melting point electron emitting material or of high melting point metals alone can be used when desired. At high electron emitting temperatures the above mentioned electrodes are more prolific emitters of electrons than pure carbon electrodes and even in a cold condition serve their purpose well.

The new and novel arc lamp is a concentrated source of high intensity light because of the high luminous density of the constricted arc. The color of the light emitted by the lamp closely approaches that of daylight since the light comprises a line spectrum superimposed upon an almost continuous spectrum. The light emitted by the lamp is rich in ultra-violet rays and rays having actinic qualities. The new and novel lamp is thus useful in many fields, such as television, photography, therapeutic work, ultra-violet irradiation of substances, and fluorescent work.

It will be understood, of course, that the shape of the container and the arrangement and shape of the electrodes can be changed, when desired, and the starting and operating circuits and devices found useful heretofore in connection with open carbon arc lamps or with gaseous electric discharge lamps having sealed containers are used to start and operate the new and novel lamp, when desired.

This application is a continuation in part of my application Serial Number 702,396 filed December 14, 1933, patented June 5, 1934, number 1,961,701.

What I claim as new and desire to secure by Letters Patent of the United States is:—

1. An arc discharge lamp comprising a container, electrodes sealed therein, a gaseous filling therein comprising cadmium vapor and hydrogen.

2. An arc discharge lamp comprising a container, electrodes sealed therein, a gaseous filling therein comprising mercury vapor, cadmium vapor and hydrogen.

3. An arc discharge lamp comprising a container electrodes sealed therein, a gaseous filling therein comprising mercury vapor, cadmium vapor, an inert gas and hydrogen.

4. An arc discharge lamp comprising a container, electrodes sealed therein, a gaseous filling therein comprising mercury vapor, cadmium vapor, a reducing gas and hydrogen.

KURT MOERS.